United States Patent [19]
Brown et al.

[11] Patent Number: 5,121,820
[45] Date of Patent: Jun. 16, 1992

[54] FEEDFORWARD CONTROL FOR AUTOMATIC TRANSMISSION TORQUE CONVERTER BYPASS CLUTCH SLIP

[75] Inventors: Larry T. Brown; Lee-Fei Chen; Davorin D. Hrovat, all of Dearborn, Mich.

[73] Assignee: Ford Motor Company, Dearborn, Mich.

[21] Appl. No.: 633,736

[22] Filed: Dec. 24, 1990

[51] Int. Cl.$^5$ .............................. F16D 33/00
[52] U.S. Cl. ........................... 192/3.3; 192/3.29; 192/0.076; 192/103 F; 364/424.1
[58] Field of Search ........... 192/3.3, 3.31, 3.29, 192/0.076, 0.077, 103 F; 364/424.1

[56] References Cited

U.S. PATENT DOCUMENTS

| | | | |
|---|---|---|---|
| 4,457,411 | 7/1984 | Hiramatsu | 192/3.31 X |
| 4,497,397 | 2/1985 | Windsor et al. | 192/0.076 |
| 4,674,609 | 6/1987 | Sturges et al. | 192/0.076 X |
| 4,706,790 | 11/1987 | Lockhart et al. | 192/3.3 |
| 4,724,939 | 2/1988 | Lockhart et al. | 192/3.31 X |
| 4,757,886 | 7/1988 | Brown et al. | 192/3.3 |
| 4,790,418 | 12/1988 | Brown et al. | 192/0.032 |
| 4,792,902 | 12/1988 | Hrovat et al. | 364/424.1 |
| 5,029,087 | 7/1991 | Cowan et al. | 192/3.3 X |

FOREIGN PATENT DOCUMENTS

| | | | |
|---|---|---|---|
| 62-270864 | 11/1987 | Japan | 192/3.3 |
| 1-30966 | 2/1989 | Japan | 192/3.29 |
| 1-30968 | 2/1989 | Japan | 192/3.29 |

*Primary Examiner*—Leslie A. Braun
*Assistant Examiner*—Andrea Pitts
*Attorney, Agent, or Firm*—Frank G. McKenzie; Keith L. Zerschling

[57] ABSTRACT

A powertrain including an engine controlled by the position of a throttle valve, a hydrodynamic torque converter having a bypass clutch, multiple ratio automatic transmission connected to the drive wheels of the vehicle, a solenoid-operated hydraulic valve that supplies pressurized fluid to engage and release the bypass clutch, is controlled by operation of a feedforward control system. An engine math model produces a signal representing the net torque output by the engine, which signal is applied as input to an inverse mathematical model of the solenoid-operated valve that supplies hydraulic fluid to the bypass clutch. The unique relationship of phase to gain, the frequency response of the solenoid valve, is inverted to remove the effects of delay and transient rise time. Torque converter slip error determined as the difference between torque converter impeller speed and turbine speed, is applied as input to a PID compensated feedback control whose output is summed with the inverse of the solenoid valve frequency response to produce a duty cycle supplied to the solenoid of the bypass pressure hydraulic valve.

13 Claims, 4 Drawing Sheets

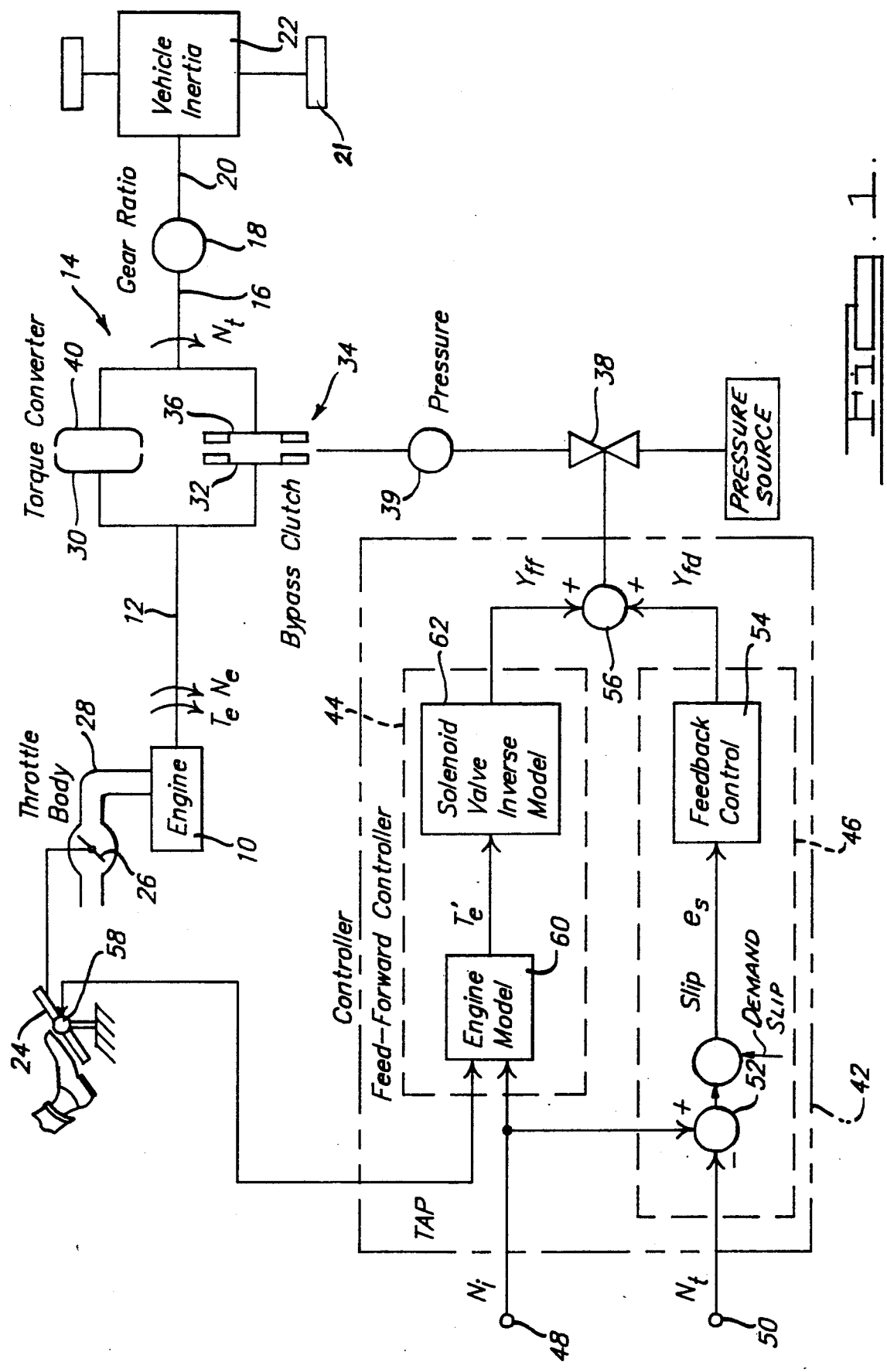

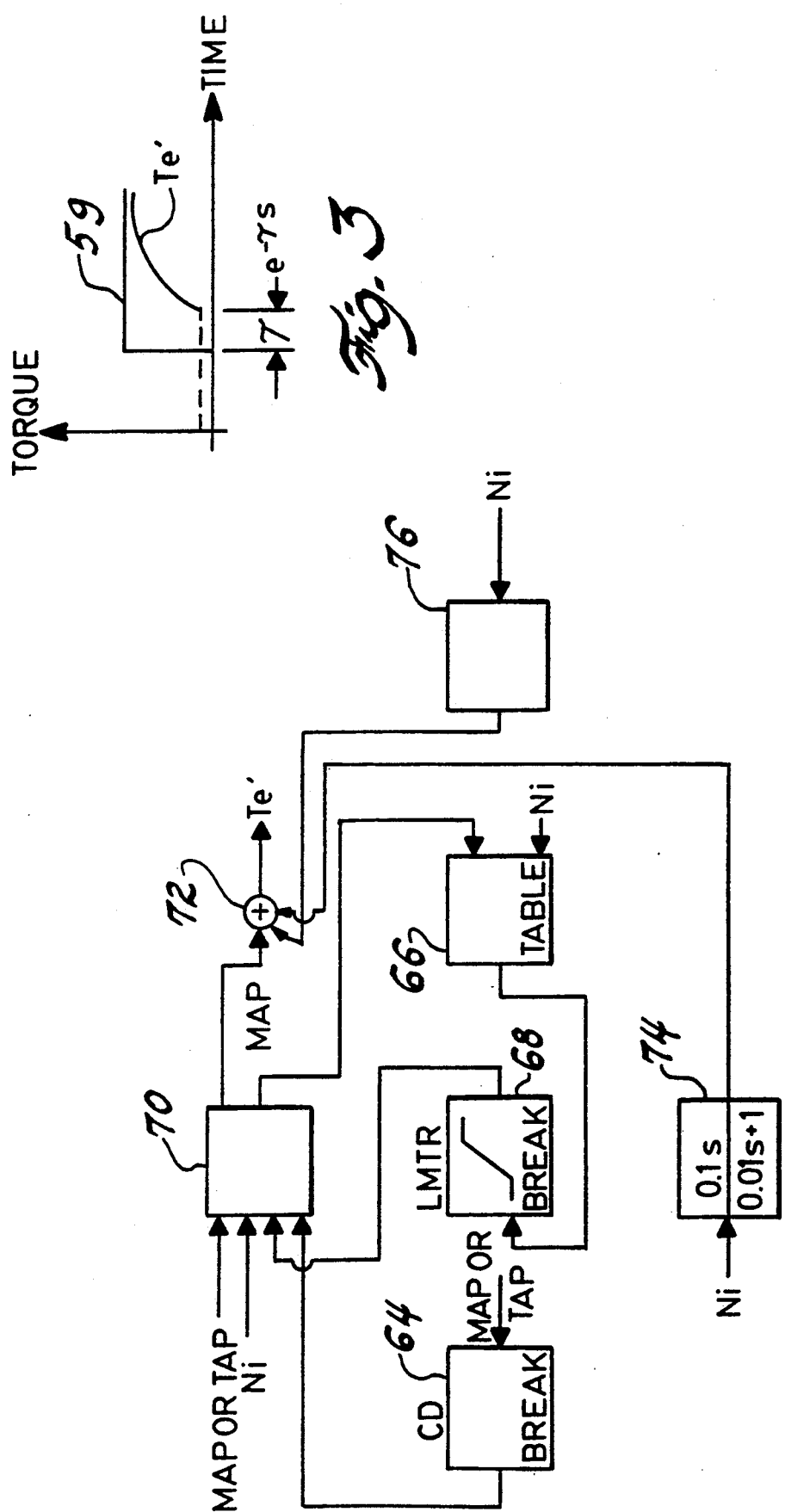

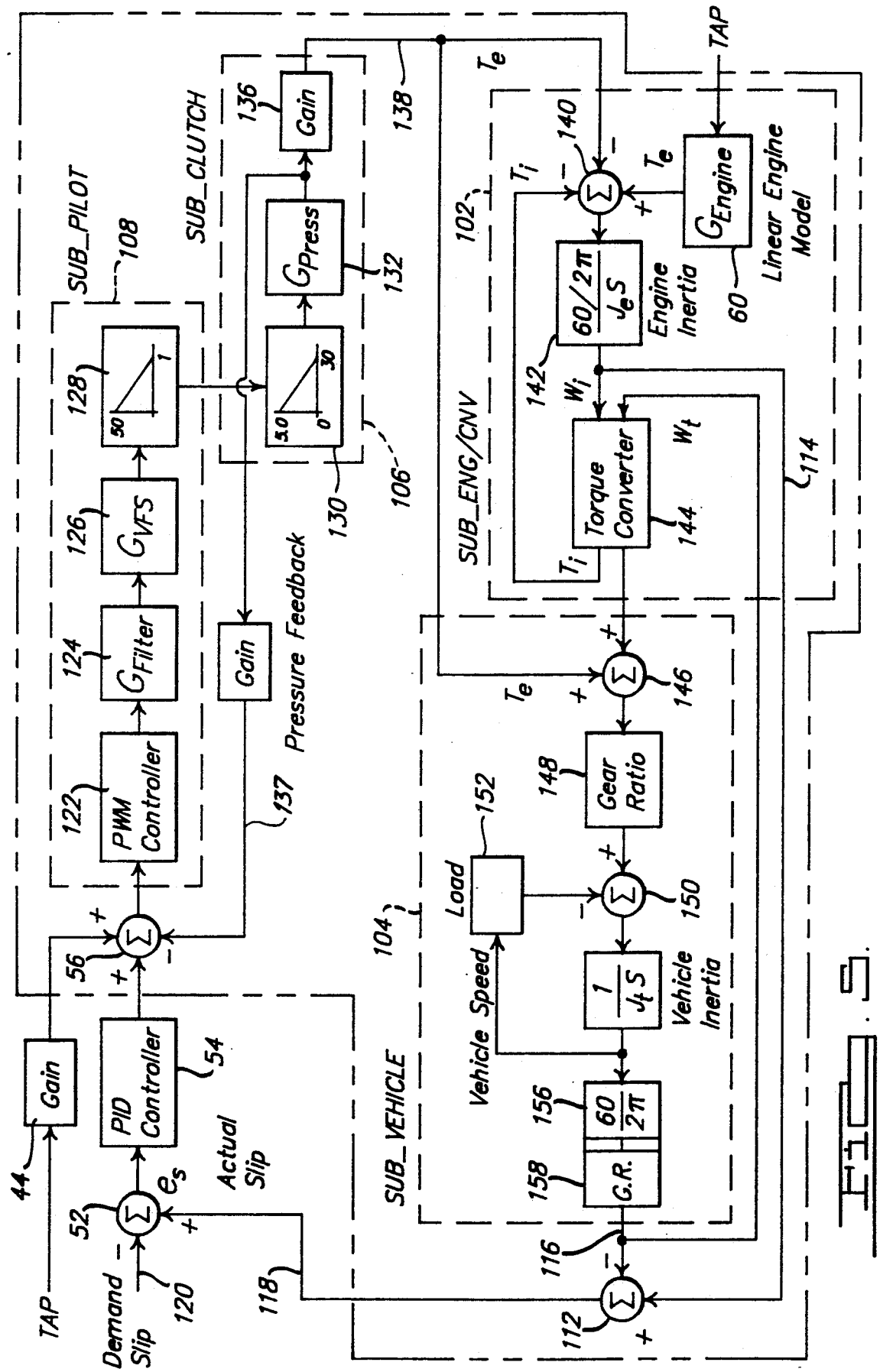

FEEDFORWARD CONTROL FOR AUTOMATIC TRANSMISSION TORQUE CONVERTER BYPASS CLUTCH SLIP

BACKGROUND OF THE INVENTION

1. Field of the Invention

This invention relates to the field of torque converters for an automatic transmission and the control of a bypass clutch that permits a variable speed difference between the driving and driven members of the torque converter. More particularly, the invention pertains to control of hydraulic pressure supplied to a torque converter bypass clutch, especially its response to an abrupt engine torque demand by a vehicle operator.

2. Description of the Prior Art

In an automatic transmission for a motor vehicle, the internal combustion engine is drivably connected to a torque converter having an impeller rotor fixed to the engine shaft and a turbine rotor driven hydrodynamically by the impeller. A typical torque converter also includes a bypass clutch, which, when engaged, mechanically connects the impeller and turbine thereby discounting the hydrodynamic connection between those components and, when disengaged, permits the conventional hydrodynamic drive between the turbine and impeller.

The torque converter bypass clutch may be controlled through operation of a solenoid-operated hydraulic valve, which pressurizes and vents the bypass clutch to engage and disengage the clutch in response to a signal applied to the solenoid. When the torque converter is opened, i.e., when the bypass clutch is disengaged, the hydrodynamic connection between the turbine and impeller absorbs and attenuates vibrations and other disturbances that are unacceptable in an automotive powertrain. However, because of the inherent losses associated with operation of a torque converter in the open mode, fuel economy is reduced. Torque converters can be controlled such that, throughout most of the range of operation, the bypass clutch is neither fully engaged nor fully disengaged but instead is modulated to produce a variable magnitude of slip, the difference between the speeds of the impeller and turbine. When operated in this way, the torque converter can be used to absorb vibrations, particularly when gear ratio changes are being made, by increasing the slip, thus permitting a greater portion of engine torque to be passed from the impeller to the turbine through hydrodynamic action. When chance of objectionable vibration and disturbance is absent, the torque converter can be more fully closed so that fuel economy is enhanced.

Generally, a control system for operating the bypass clutch responds to a vehicle operator's demand for a change in engine torque on the basis of changes made manually to the position of the throttle valve. In normal operation, these changes are made abruptly yet the system must respond quickly to the change in torque demand in order to satisfy the driver's expectations and satisfy fuel economy and powertrain vibration criteria. Delays are inherent in a powertrain of this type. Engine inertia causes a delay in producing a change in engine output in response to a throttle position change, and there are other delays in the control system associated with clutch inertia, hydraulic system inertia, viscosity, friction, and other such phenomena.

U.S. Pat. No. 4,757,886 describes a closed loop control system for controlling operation of a transmission bypass clutch on the basis of slip across the torque converter. The system employs measured slip as a feedback signal combined with a command signal to produce a slip error. Thereafter, a duty cycle correction on the basis of the difference between duty cycles in the current sampling period and the previous sampling period is developed and processed to produce a clutch pressure signal. That signal is used to vary the slip and is feed back to enhance stability of the duty cycle error signal.

U.S. Pat. No. 4,790,418 describes a technique for controlling the transfer of torque from an offgoing friction element to an oncoming friction element when a gear ratio change is made in an automatic transmission. Slip across the offgoing clutch is used to control engine speed. The time rate of change of torque in the offgoing clutch is used as a basis to change clutch pressure in accordance with a calculated torque slope.

U.S. Pat. No. 4,792,902 describes a system and a method for controlling ignition timing of an internal combustion engine in a driveline that includes a multiple speed ratio transmission. The spark timing of the engine is advanced and retarded on the basis of engine speed and transmission output speed by a control algorithm that improves the speed ratio control during gear ratio changes. None of these patents describes a feedforward technique for controlling the bypass clutch of an automatic transmission.

SUMMARY OF THE INVENTION

If in the operation and control of the powertrain of this type, torque converter slip is too small, then an abrupt engine throttle position disturbance could cause bypass clutch lockup and associated drivability difficulties. One way to maintain desired slip is to employ feedback control using an error signal as a measure of slip across the torque converter bypass clutch. A feedback algorithm for controlling the clutch can employ either classical PID Compensation, including lead and lag terms if required, or a modern compensation technique. To overcome these difficulties and to improve slip control in comparison to results produced by current practice, the bypass clutch control system of the present invention adds feedforward control on the basis of throttle angle position and engine speed to feedback control.

The control of this invention is adaptable for use in a powertrain including an engine controlled by the position of its throttle valve, a hydrodynamic torque converter having a bypass clutch, and a multiple ratio automatic transmission connected to the drive wheels of the vehicle. A solenoid-operated hydraulic valve, which supplies pressurized fluid to engage and release the bypass clutch, is controlled by operation of a feedforward control system. The position of the throttle valve and the speeds of the torque converter impeller and turbine are applied as input to a mathematical model programmed in algorithmic form for execution by a digital microprocessor. The engine produces a signal representing the net torque output by the engine, which signal is altered by the usually small torque carried by the converter and is then applied as input to an inverse mathematical model of the solenoid-operated valve that supplies hydraulic fluid to the bypass clutch. The unique relationship of phase to gain, the frequency response of the solenoid valve, is inverted to account for inherent and measurable response delay and to remove effects of delay. Slip error is determined as the difference between torque converter impeller speed and turbine speed. The error is applied as input to a PID compensated feedback control whose output is summed with the inverse of the solenoid valve frequency response to produce a duty cycle or analog current supplied to the solenoid of the bypass pressure hydraulic valve.

In this way, delay in response of the bypass clutch to a change in torque demand on the engine, resulting from a change in the Position of the engine throttle, is prevented precisely by anticipating the inherent delay in the system and producing a control duty cycle or control current correction that accounts accurately for the inherent delay associated with a solenoid and the hydraulic bypass clutch valve that it operates. The feedforward signal is combined with a PID compensation feedback control signal so that the corrected control signal accounts for a change of engine torque and for the delays inherent in the system. The system effectively removes delay by providing a control duty cycle correction that accounts precisely for the phase lag or lead and gain associated with response of the system to engine torque demand.

BRIEF DESCRIPTION OF THE DRAWING

FIG. 1 is a diagram of a closed loop torque converter bypass clutch slip control according to this invention.

FIG. 2 is a diagram representing a mathematic model of an engine, a component of the feedback system of FIG. 1.

FIG. 3 shows the response of engine torque to a step throttle position produced by an engine model in a control system of this invention.

FIG. 5 is a closed loop system for controlling operation of a torque converter bypass clutch having feedforward and feedback characteristics according to this invention.

DESCRIPTION OF THE PREFERRED EMBODIMENT

Figure 4:
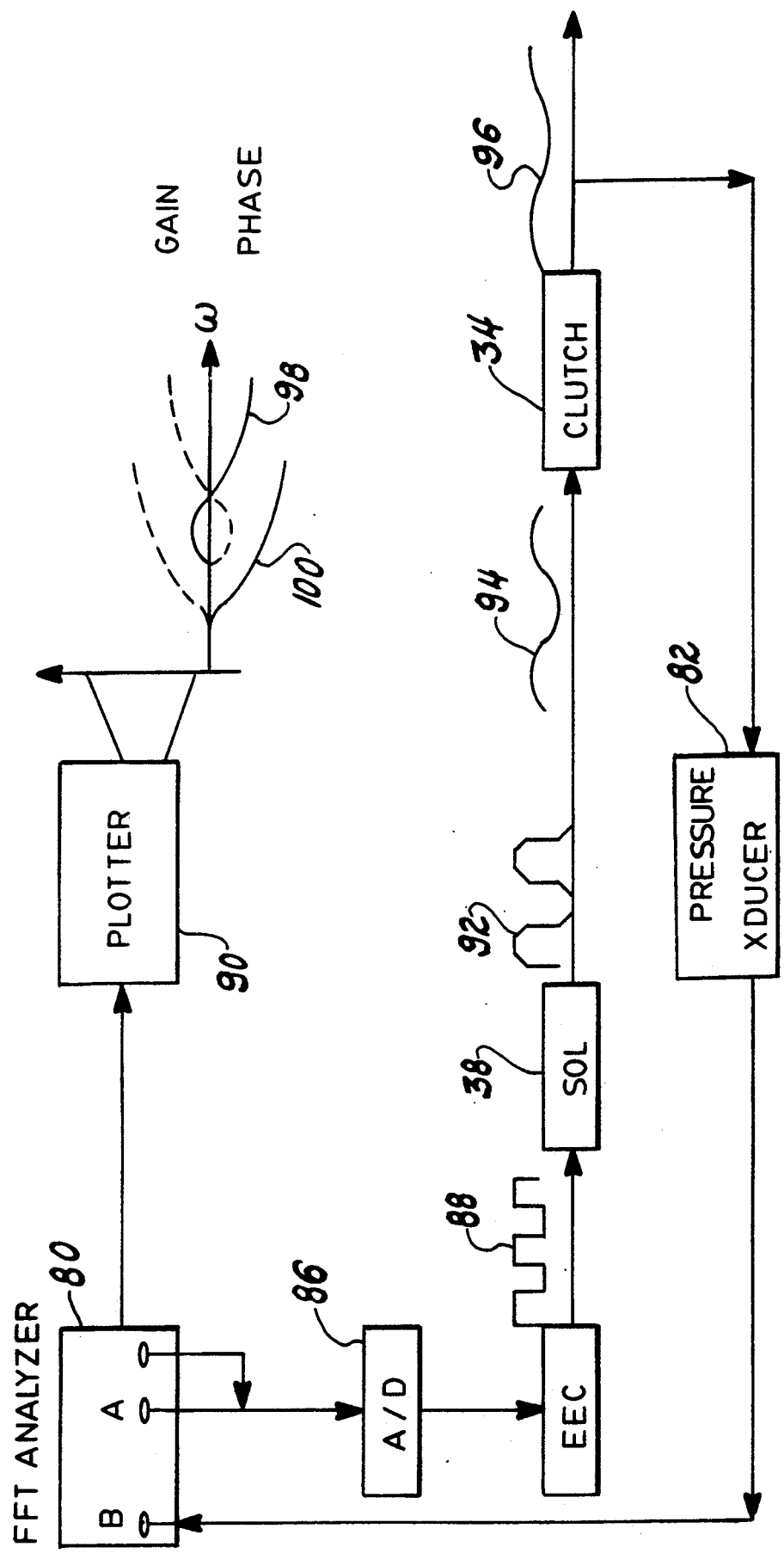
FIG. 4 is a schematic diagram showing the arrangement for determining the inverse frequency response of a solenoid valve, clutch and related hydraulics in a control system.

FIG. 1 shows the components of a powertrain of an automotive vehicle to which the closed loop bypass clutch control of the present invention can be applied. An internal combustion engine 10 is drivably connected through an engine crankshaft 12 to a torque converter, which is connected by a turbine shaft or transmission input shaft 16 to the transmission gear box 18 input. The transmission contains multiple speed ratio gearsets, clutches, brakes, a hydraulic control system, solenoid-operated shift valves, a microprocessor, and sensors producing signals representing shaft speeds, throttle position and other operating variables. The gearbox is connected through the transmission output shaft 20 to the drive wheels 21 of the vehicle. In the figure, vehicle inertia is the principal load driven by the powertrain.

The vehicle operator controls the position of an accelerator pedal 24, whose movement changes the position of the throttle valve 26 located in the engine intake manifold. The torque produced by the engine (Te) and the engine speed (Ne) are carried on engine shaft 12 to the torque converter impeller 30 and to a friction disc 32 of the torque converter bypass clutch 34. The bypass clutch includes a second friction disc 36, which is moved into frictional driving engagement with disc clutch 32 through operation of a solenoid-operated bypass valve 38. The valve produces output pressure supplied to a servo of the bypass clutch, which, when pressurized, forces discs 32 and 36 into frictional driving engagement and, when vented, permits the discs to disengage. The impeller drives the turbine hydrodynamically as the impeller and turbine rotate about the axis of the torque converter through hydraulic fluid contained in a casing continually supplied with fluid from the hydraulic circuit. The circuit includes a pump or other pressure source for pressurizing the hydraulic circuit, the various clutches and brakes of the transmission control system, the lubrication system of the transmission gearbox, and the torque converter itself.

A controller for controlling operation of solenoid valve 38 includes a feedforward control portion 44 and a feedback control portion 46. The difference between impeller speed (Ni) and turbine speed (Nt) is called torque converter slip. Speed sensors 48 and 50 produce signals representing impeller speed and turbine speed, which signals are applied as input to a summing junction 52 where their difference, slip $e_s$ is applied as input to a feedback control 54 whose output signal $Y_{fd}$, is applied as input to summing junction 56.

The difference equation implemented in software for the proportional, integral, differential PID compensator 54 is:

$$Y_{fd} = Y_{fd}(k-1) + K_p[e_s(k) - e_s(k-1)] + K_i e_s(k) + K_d [e_s(k) - 2e_s(k-) + e_s(k-2)]$$

where $e_s(k) = N_i(kl) - N_t(k)$ is slip at sampling instant k; $N_i(k)$ is impeller speed or engine speed $N_e(k)$ at sampling instant k; $N_t(k)$ is turbine speed at sampling instant k; $(k-1)$ refers to the immediately preceding sampling instant; $(k-2)$ refers to sampling instant that preceded the immediately preceding sampling instant; and $K_p$, $K_d$ and $K_i$ are proportional, derivative, and integral gains, respectively.

A sensor 58 produces a signal representing the position of the accelerator Pedal or throttle valve, the extent to which throttle valve opens the engine intake manifold. The signal, throttle angular position TAP or intake manifold pressure MAP downstream from the throttle valve 26 or mass air flow MAF into the engine, is applied as input to the engine and torque converter mathematic model 60. This model produces an output signal (Te'), net engine torque, which is applied as input to solenoid valve inverse model 62. The output $Y_{ff}$ from model 62 is combined at summing junction 56 with the output $Y_{fd}$ from the PID control 54 to produce a pulse width modulated PWM duty cycle or an analog current for a variable force solenoid VFS. The signal applied to the solenoid operates a hydraulic valve 38, which opens and closes communication between the pressure source and clutch 84 or 86, whichever clutch controls the speed ratio during the speed ratio change. The valve produces a control pressure in accordance with the magnitude of the duty cycle or current, thereby controlling the transfer of torque from the offgoing clutch to the oncoming clutch as the controlling clutch is engaged or disengaged.

FIG. 2 shows logic elements of the engine model that produces the output signal $T'_e$. Input signals representing TAP or MAP or MAF and $N_i$ are applied as input together with coefficient of discharge (CD), a variable representing a measure of pressure drop across the throttle plate of the intake manifold. The value for coefficient of discharge is produced by element 64 in accordance with a predetermined relationship when TAP is known.

Input signals representing engine speed $N_e$, the position of the engine throttle TAP and MAP are supplied as input to a segment of logic representing a relationship among these variables and its output variable, volumetric efficiency of the engine. A signal representing this output value is applied as input to a limiter 68 to produce a linearly variable range of output signal on the basis of the output signal representing engine volumetric efficiency. Output from limiter 68 is also applied to engine manifold intake model 70. On the basis of these input variables, engine model 70 produces a signal representing gross engine torque, representing the delay response between an abrupt change in throttle input shown in FIG. 3 and accounting for the time constant that controls response of the engine to a value of torque converter load torque commensurate with the change in throttle position. Engine model 70 produces an engine torque output signal having a pure delay $\tau$ representing engine induction and power process transient response characterized by a rise time representing engine manifold filling dynamics. FIG. 3 shows graphically the phase delay and rise time of the response to an abrupt change in throttle position, which produce the torque step 59 shown in FIG. 3.

The output signal Te' is applied to summing junction 72. However, account is also taken at summing junction 72 for a reduction of engine output torque due to engine rotating inertia. A portion 74 of the engine model of FIG. 2 includes a transfer function relating the first time derivative of engine speed and engine inertia to torque associated with overcoming engine inertia. Control block 76 produces a signal representing a reduction in engine torque due to friction loss.

The outputs from control elements 70, 74 and 76 are combined at summing junction 72 where the net engine torque Te' signal having the characteristic response, including phase delay and time constant effect, of the actual engine torque to a throttle position disturbance.

The model 60 also includes static representation for the torque converter characteristics such as its torque amplification effect on engine torque and dynamic characteristics such as phase shift, transient rise time, and settling time.

The model represented by block 62 contains a transfer function relating engine torque to the inverse of clutch Pressure produced as output by valve 38. The output signal $Y_{ff}$ is related to the engine torque input by an inverse transfer function representing operation of solenoid valve 38, the related hydraulic components for actuating the torque converter bypass clutch 34 and the clutch itself. The output is a dynamic response containing dynamic characteristics such as phase shift transient rise time, overshoot, and transient duration. The gain is produced by a Fast Fourier Transform FFT analyzer 80, such as that produced by Hewlett Packard Corporation, illustrated in and described with reference to FIG. 4.

To establish the inverse frequency response, the solenoid, the hydraulic valve 38 operated by the solenoid, and bypass clutch 34 are tested on a dynamometer. Pressure present within bypass clutch 34 causes a pressure transducer 82 to produce a feedback signal to the FFT analyzer 80. Mixed frequency signal in the form of input noise is supplied to the solenoid. Output in analog form produced by the analyzer passes through A-to-D converter 86 to produce a signal 88 applied as input to the solenoid when a PWM signal is employed. If the solenoid is a variable force solenoid, a mixed frequency analog current is supplied to the solenoid. The analyzer contains a plotter 90 that shows the unique gain and phase relationship of the pressure within clutch 34 over the frequency range of the signal applied to the solenoid.

In FIG. 4, waveforms representing the on-off state of the solenoid is represented at 92, pressure output by the hydraulic valve at 94, and pressure within clutch 34 at 96. The gain 98 and phase of the response produced by the analyzer 80 in the form of a transfer function are inverted to Produce an inverted output from model 62 in response to the net engine torque signal Te'. This inversion is done to anticipate engine response including induction-to-power delay so that clutch bypass pressure signal applied at summing junction 56 is in phase with the engine torque signal, the signal applied as output from engine 10. Therefore, delay in response of the clutch pressure to an engine torque disturbance is avoided because the control signal applied to the solenoid leads the control pressure response by an equivalent of the engine delay period. The transient rise time of the response is avoided because the control signal of the solenoid is the precise increase of the transient period. FIG. 3 shows the typical inverted form of the control signal.

Referring now to FIG. 5, the feedforward and feedback control of this invention is combined with an engine-torque converter unit 102, vehicle inertia and external load 104, bypass clutch 106 and hydraulic pilot valve 108. Actual slip is determined at summing junction 112 where an impeller speed signal on line 114 is combined with a turbine speed signal on line 116 to produce actual slip output on line 118. The commanded slip signal on line 120 is produced by a microprocessor that controls operation of the transmission, including the torque converter bypass clutch, on the basis of algorithms that are executed repeatedly to process input information indicating the current state of various operating parameters of the transmission, powertrain and vehicle. The commanded slip is combined at junction point 52 with the actual slip to produce a slip error $e_s$ as input to PID controller 54. The output of the feedforward controller 44, or a gain instead of a feedforward control signal, is combined at summing junction 56 with the output of the PID controller. Gain 44 applied to throttle angle produces an output proportional to throttle position input. A voltage representing clutch pressure, as measured by a pressure transducer, is carried to summing junction 56.

The output of summing junction 56 is applied as input to PWM generator 122 to produce a corrected duty cycle at frequency of approximately 67 Hz. The duty cycle is approximately 50 percent when error is substantially zero and is altered from 50 percent duty cycle in accordance with the magnitude of the error signal input. The corrected duty cycle is therefore a pulse-width modulated PWM saw-toothed waveform having the requisite duty cycle. A signal having this waveform is applied as input to a Butterworth filter 124, which subtracts the analog carrier from the digital signal. The dynamics of a variable force solenoid is represented at 126 for converting the digital output after filter 124 to a current that will drive VFS solenoid 38. The variable force solenoid is driven by an analog signal but the error processing in this control is produced by a digital microprocessor; hence, various conversions are made at points along the system to converter analog signals to digital signals. A function 128 relates VFS current to clutch pressure produced by hydraulic valve 34. This function is such that when the VFS current is zero, clutch pressure is approximately 50 psi and when current is 1 amp, the clutch pressure is zero.

The VFS pressure signal is then processed by a function 130 relating the magnitude of clutch pressure to the static component of VFS pressure. Function 130 produces an inverse relationship between these variables such that when VFS pressure is zero, clutch pressure is a maximum of approximately 20 psi and when VFS pressure is 50 psi, clutch pressure is substantially zero. The clutch pressure signal, a voltage produced as output by transfer function 132, is carried back on line 137 through a pressure transducer to summing junction 56 in order to augment stability of the duty cycle correction produced at PWM generator 122. Clutch pressure is multiplied by gain 136 to convert the pressure signal to a clutch torque signal present on line 138.

The engine-torque converter model 102 includes a summing junction 140 where signals representing clutch torque, impeller torque and engine torque are summed to produce net engine output torque. A linear engine model 60 receives the throttle angle Position signal as input to produce total engine output torque. At 142, engine inertia operates on the net output engine torque to produce impeller angular acceleration which is integrated once through LaPlace transfer operation to produce impeller angular velocity. The model 144 for the torque converter containing its K curve function and its dynamic characteristics receives impeller angular velocity and turbine angular velocity as input and produces as output impeller torque Ti and turbine torque Tt. Impeller torque is fed back to summing junction 140, and turbine torque is applied to summing junction 146 where it is combined with clutch torque to produce a signal representing transmission input shaft torque.

Vehicle model 104 contains constants representing the gear ratios 148 produced by the several forward and reverse gear drive ratios produced by the multiple gearing of the transmission. When the transmission input torque is multiplied by the relevant gear ratio constant 148, a signal representing wheel torque is output and applied to summing junction 150 where it is combined with a load associated with the aerodynamic coefficient of the vehicle to produce as output from that summing junction 150 a signal representing load at the drive wheels of the vehicle. Load function 152 contains a relationship between vehicle speed and an equivalent torque associated with vehicle load due to aerodynamic drag, a magnitude of torque, which when subtracted from the maximum transmission output shaft torque, is the net torque available at the drive wheels of the vehicle. Vehicle inertia Jt, a constant stored at 153, is multiplied by the net drive wheel torque to produce angular acceleration of the vehicle, which acceleration is integrated once by LaPlace transform operation to produce vehicle speed. This value is then multiplied by constant 156 to convert vehicle speed dimensions to revolutions per minute and that value is multiplied by the gear ratio 158 to produce turbine speed in rpm. The value of turbine speed is fed back as input to the torque converter model 144 and is applied as input to summing junction 112 to produce a signal representing the actual slip in rpm. That signal is carried on line 118 to summing junction 52 where it is combined with command slip to produce the error slip signal supplied as input to PID controller 54.

A modification of the control of FIG. 5 substitutes the feedforward control of FIG. 1 for the gain represented by block 44 in FIG. 5. The control illustrated in FIG. 5 produces a duty cycle correction immediately when the driver changes the throttle angle position because the continually available TAP signal is attenuated immediately when the feedforward control is substituted for the gain input to generator 122. When the engine torque signal is passed through the gain term 44, the slip transient amplitude is reduced by 30 percent. The feedforward technique of this invention, which passes engine torque signal Te' through a low-pass filter inverse of the solenoid valve, ideally reduces slip to zero, or in actual practice to a very small value.

Having described a preferred embodiment of our invention, what we claim and desire to secure by U.S. Letters Patent is:

1. A system for controlling a torque converter bypass clutch in an automatic transmission producing an operating gear ratio connected to an engine controlled by a variable position throttle, comprising:
  a torque converter having an impeller adapted for connection to the engine, a turbine adapted for hydrokinetic connection to the impeller, and a clutch whose full engagement mechanically connects the impeller and turbine and whose full release mechanically disconnects the impeller and turbine, partial engagement of the clutch permitting a difference in speed or slip between the impeller and turbine;
  a source of hydraulic pressure;
  an electrical solenoid-operated valve opening and closing communication between the pressure source and the clutch, for producing pressure of variable magnitude in the clutch in response to a signal applied to the solenoid;
  means for producing signals representing impeller speed, turbine speed, and throttle position;
  feedback control means supplied with a slip error signal representing the difference between actual slip and commanded slip for producing a first control signal;
  feedforward control means supplied with a signal representing impeller speed and throttle position for producing a second control signal whose phase and gain are inverted in comparison to a phase and gain of a clutch pressure response to a signal applied to the solenoid;
  means for summing the first and second control signals and producing a corrected control signal therefrom;
  means for controlling the speed difference across the torque converter by supplying said corrected control signal to the solenoid.

2. The system of claim 1 wherein the feedback control means includes compensator means for phase compensating a slip error duty cycle including a proportional, integral, differential compensator.

3. The system of claim 1 wherein the turbine speed signal producing means includes:
  means responsive to the signals representing throttle position and engine speed for producing a signal representing net engine torque;
  means for producing signals representing turbine torque and clutch torque;

means responsive to a sum of engine torque, clutch torque and impeller torque for producing a signal representing impeller speed;

means containing operating characteristics of the torque converter and responsive to signals representing impeller speed and turbine speed for producing signals representing impeller torque and turbine torque;

means containing the operating gear ratio of the transmission, responsive to a sum of clutch torque and turbine torque for producing a signal representing torque at the drive wheel of the vehicle;

means containing vehicle inertia and the operating gear ratio of a current gear produced by the transmission and responsive to drive wheel torque for producing a signal representing turbine speed.

4. The system of claim 1 wherein the controlling means includes:

PWM generator means responsive to the corrected control signal for producing a PWM signal having a carrier frequency and a duty cycle proportional to the slip error;

filter means adapted to receive the PWM generator output for converting the PWM signal to a continuous signal;

variable force solenoid means operating a pilot valve connected to the pressure source, responsive to the continuous signal for producing a hydraulic pressure signal inversely proportional to a PWM duty cycle;

means for producing clutch pressure inversely proportional to the hydraulic pressure signal.

5. The system of claim 4 further comprising pressure transducer means for converting clutch pressure to a signal carried to the summing means.

6. A system for controlling a torque converter bypass clutch in an automatic transmission connected to an engine controlled by a variable position throttle, comprising:

a torque converter having an impeller connected to the engine, a turbine adapted for hydrokenetic connection to the impeller, and a clutch whose full engagement mechanically connects the impeller and turbine and whose full release mechanically disconnects the impeller and turbine, partial engagement of the clutch permitting a difference in speed or slip between the impeller and turbine;

a source of hydraulic pressure;

an electrical solenoid-operated valve opening and closing communication between the pressure source and the clutch, for producing pressure of variable magnitude in the clutch in response to a signal applied to the solenoid;

means for producing signals representing impeller speed, turbine speed, and throttle position;

feedback control means supplied with a slip error signal representing the difference between actual slip and commanded slip for producing a first control signal;

feedforward control means supplied with a signal representing impeller speed and throttle position including means producing a signal representing engine torque and means response to the engine torque signal for producing a second control signal whose phase and gain are inverted in comparison to the phase and gain of the clutch pressure response to a signal applied to the solenoid;

means for summing the first and second control signals and producing a corrected control signal therefrom;

means for controlling slip across the torque converter by supplying said corrected control signal to the solenoid.

7. The system of claim 6 wherein the engine torque producing means comprises:

means responsive to pressure in an engine manifold downstream from the engine throttle for producing a signal representing volumetric efficiency of the engine;

means responsive to throttle position for producing a signal representing fluid pressure drop across the engine throttle;

means responsive to the throttle position signal, engine speed signal, pressure drop signal, and efficiency signal for producing a signal representing engine torque.

8. The system of claim 6 further comprising:

means containing a transfer function relating engine speed and torque associated with overcoming engine inertia, responsive to the impeller speed signal for producing a signal representing torque associated with engine inertia;

summing means for combining the signal representing engine torque and the signal representing torque associated with engine inertia for producing a signal representing static and dynamic response of the engine to a change in throttle position and engine speed.

9. The system of claim 6 further comprising means relating engine speed to torque associated with overcoming impeller friction, responsive to the engine speed signal for producing a signal representing torque associated with engine friction loss;

summing means for combining the signal representing engine torque, the signal representing torque associated with engine friction loss and the signal representing torque associated with engine inertia for producing a signal representing static and dynamic response of the engine to a change in throttle position and engine speed.

10. A method for controlling a torque converter clutch operating in an automatic transmission connected to an engine controlled by a variable position throttle the torque converter having an impeller to the engine, a turbine adapted for hydrokenetic connection to the impeller, and a clutch whose full engagement mechanically connects the impeller and turbine and whose full release mechanically disconnects the impeller and turbine, partial engagement of the clutch permitting a difference in speed or slip between the impeller and turbine, an electrical solenoid-operated valve communicating with the clutch, comprising the steps of:

producing pressure of variable magnitude in the clutch by opening and closing communication between a source of hydraulic pressure and the clutch in response to a signal applied to the solenoid;

producing signals representing impeller speed, turbine speed, and throttle position;

producing a first control signal in response to a slip error signal representing the difference between actual slip and commanded slip;

producing a second control signal whose phase and gain are inverted in relation to the phase and gain of the clutch pressure in response to a signal applied to the solenoid;

summing the first and second control signals and producing a corrected control signal therefrom;

controlling the speed difference across the torque converter by supplying said corrected control signal to the solenoid.

11. The method of claim 10 further comprising;

producing a signal representing net engine torque in response to the signals representing throttle position and engine speed;

producing signals representing turbine torque and clutch torque;

producing a signal representing impeller speed in response to a sum of engine torque, clutch torque and impeller torque;

producing signals representing impeller torque and turbine torque in response to signals representing impeller speed and turbine speed;

producing a signal representing torque at the drive wheel of a vehicle in response to the sum of clutch torque and turbine torque;

producing a signal representing turbine speed in response to drive wheel torque.

12. The method of claim 10 further comprising:

producing a PWM signal having a carrier frequency and a duty cycle proportional to the slip error;

converting the PWM signal to a continuous signal;

producing a hydraulic pressure signal inversely proportional to PWM duty cycle;

producing clutch pressure inversely proportional to the hydraulic pressure signal.

13. The method of claim 12 further comprising:

converting clutch pressure to a signal representing clutch pressure;

summing the first and second control signals and the signal representing clutch pressure and producing a corrected control signal therefrom;

controlling the speed difference across the torque converter by supplying said corrected control signal to the solenoid.

* * * * *